April 5, 1949.
O. G. LELLEP
2,466,601
PROCESS AND APPARATUS FOR BURNING CEMENT AND LIKE MATERIALS
Filed Dec. 8, 1948
2 Sheets-Sheet 1
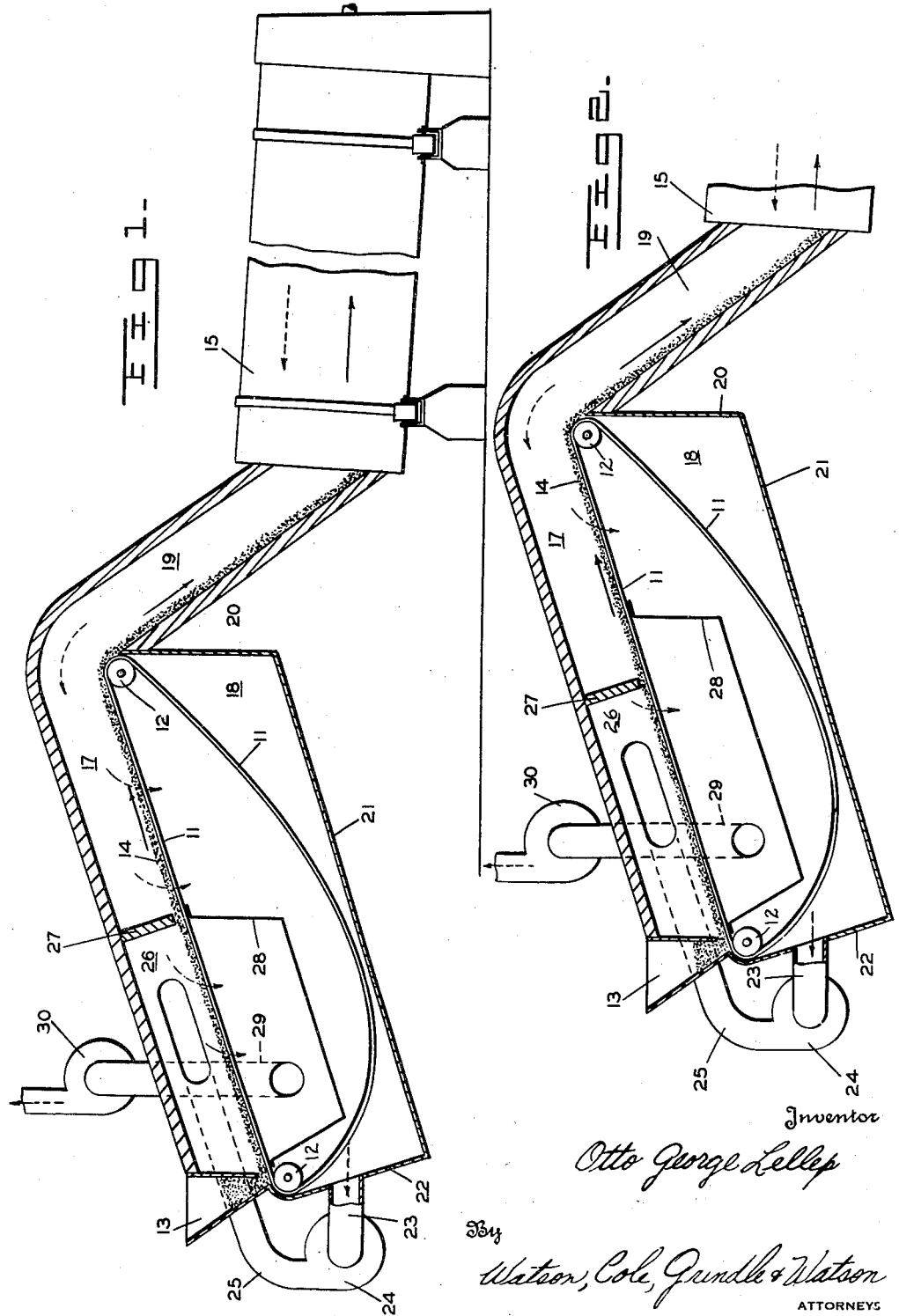
Inventor
Otto George Lellep
By
Watson, Cole, Grindle & Watson
ATTORNEYS April 5, 1949.  O. G. LELLEP  2,466,601
PROCESS AND APPARATUS FOR BURNING
CEMENT AND LIKE MATERIALS
Filed Dec. 8, 1948  2 Sheets-Sheet 2
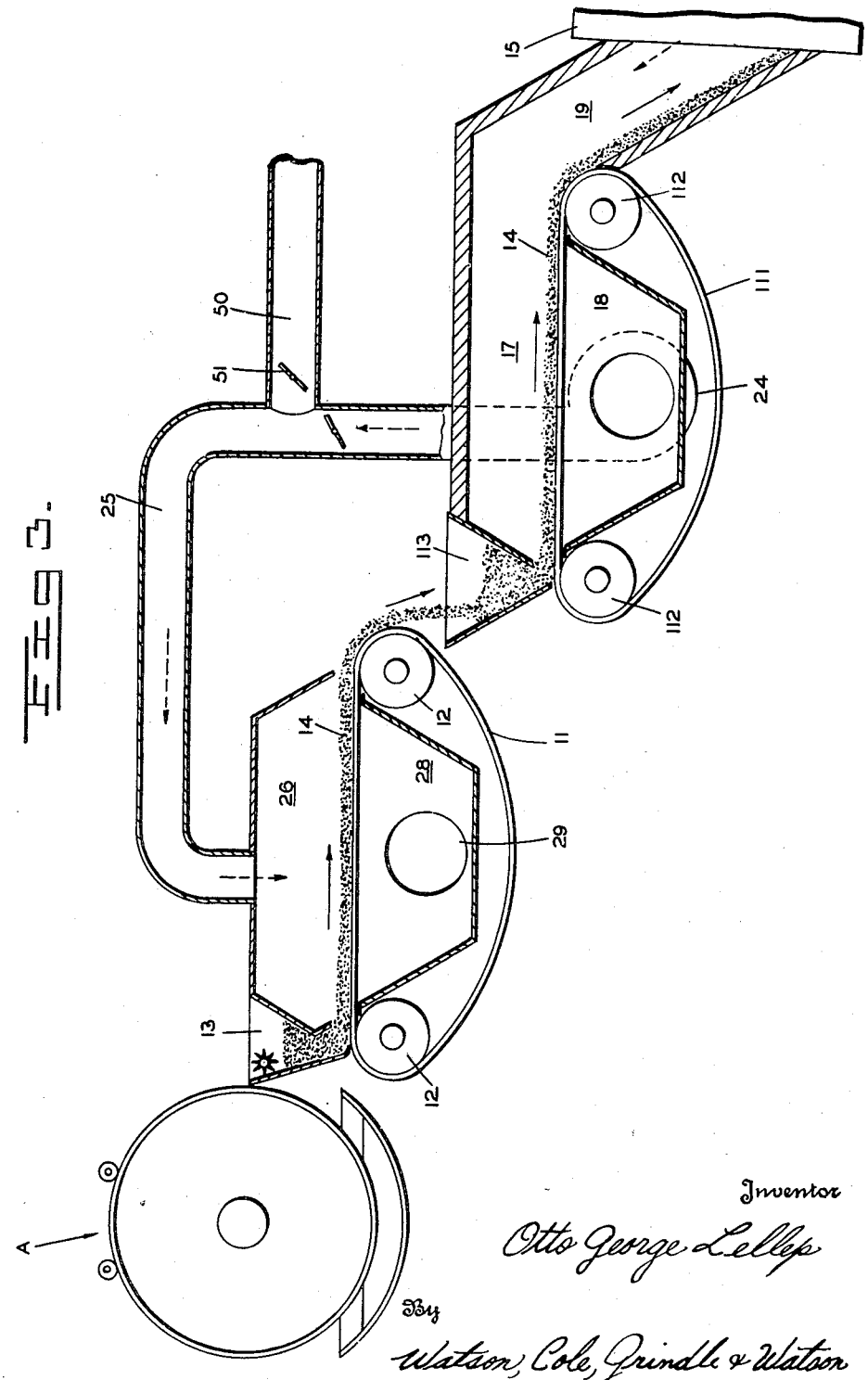

Patented Apr. 5, 1949

2,466,601

UNITED STATES PATENT OFFICE 2,466,601

PROCESS AND APPARATUS FOR BURNING CEMENT AND LIKE MATERIALS

Otto George Lellep, Berkeley, Calif.

Application December 8, 1948, Serial No. 64,206

5 Claims. (Cl. 263—53)

1

This invention relates to a method and apparatus utilized for burning cement or lime. In particular, the invention deals with a method and apparatus which employs a layer of granular material which is conveyed upon a traveling grate and treated with exit gases of a rotary kiln.

This application is a continuation-in-part of my copending application Serial No. 731,505, filed February 28, 1947.

This invention represents an improvement in cement processes and grates of the type described in my United States Patent No. 1,775,313, granted September 30, 1930, in which cement raw materials which are to be introduced into a rotary kiln are pre-burned on the grate of the pre-treatment apparatus by the exit gas of the kiln to the extent of reducing the $CO_2$ in the raw material by about 25%.

The instant invention may be employed in connection with both wet and dry cement manufacturing processes which employ pre-treatment of the raw materials in a granular form, and one of the principal objects of the invention is to lower the heat consumed in burning the material and to prevent cracking or disintegration of the moist granules when the granules are exposed to sudden heating by reason of the escaping steam which is formed within the granules by the heating. This development is economically important since preventing disintegration of the granular material into powder permits a better gas permeability of the layer of nodules on the grate and results in a higher output of the burning equipment with substantially less power consumption.

A further and primary object of the invention is to diminish radically dust losses into the stack of the material being burned by conducting the dust laden exit gases of the associated kiln through the layer of granular material in the specific manner hereafter disclosed.

Other objects and advantages of the invention will be apparent from the following detailed description made with reference to the accompanying drawings in which:

Figure 1 is a diagrammatic illustration of a kiln embodying the instant invention;

Figure 2 illustrates a modification of the structure and process employed in the raw material pre-treatment; and Figure 3 is a modification of the apparatus which employs separated drying and pre-burning chambers.

Referring to Figures 1 and 2, it will be seen that the gas pervious traveling grate of the pre-

2 treatment apparatus indicated at 11 is supported upon and driven by the rollers 12. The moist granules or nodules of the raw material, which may be formed by any well-known method, for example, that shown in United States Patent No. 1,775,313, issued to me, are charged into the bin 13 from which they fall to the traveling grate and form a uniform layer of the material 14, which may be about six inches in depth. When the process is utilized in the manufacture of cement the nodules may vary in diameter from about one-eighth inch to one inch. The dust-laden exit gas from the associated rotary kiln 15 enters the pre-treatment apparatus through the channel 19 and fills the pre-burning chamber 17 above the layer of granular material being conveyed on the traveling grate. A suction box 18 having walls 20, 21, and 22 is formed beneath the pre-burning chamber 17 and provided with an opening in the wall 22 in which the conduit 23 is disposed. The gases delivered to the pre-burning chamber are drawn downwardly through the grate 11 and into the suction box 18 and thence into the conduit 23 by the action of the exhaust fan 24. The gases thus exhausted are delivered by the fan 24 into the drying chamber 26 through the conduit 25. The drying chamber 26 and the pre-burning chamber 17 are provided with a common wall 27 which terminates at a distance above the grate 11 which will permit the layer of granular material 14 carried on the grate to pass beneath the lower edge of the wall as it is conveyed from the drying chamber to the pre-burning chamber. A suction box 28 enveloped within the suction box 18 is disposed immediately under the grate 11 and beneath the drying chamber 26. This suction box is provided with an outlet 29 which is connected to the exhaust fan 30 whereby the gases delivered into the drying chamber are drawn downwardly through the layer of material being conveyed through the drying chamber and into the suction box 28 for discharge to the atmosphere through conduit 29. It has been found that in ordinary practice the temperature of the exit gas from the kiln is approximately 1800° F. whereas the temperature of the gases exhausted from the suction box 18 for delivery to the drying chamber is approximately 400°–500° F. This latter temperature is sufficient to accomplish a slow drying of the nodules passing through the drying chamber without causing them to disintegrate and succeeds in reducing the moisture content to an extent which will prevent the sudden formation of steam within the nodules when they are conveyed into the hot-preburning zone. The gases exhausted from the suction box 28 by the fan 30 are at approximately 180° F. thus indicating that the heat losses of the process are substantially minimized.

The length of the suction box 28 may be extended so that the suction box 28 encloses a portion of the space directly beneath the pre-burning chamber 17 as indicated in Figure 2. This construction permits control of the volumes of gas which are handled by the fans 24 and 30 and also permits regulation of the temperature existing in different parts of the apparatus. For example, it may be desirable to maintain the temperatures in the conduit 29 and the fan 30 at a point above the dew point of the gas in order to prevent corrosion of the metal elements of the apparatus by altering the structure in this manner.

Figure 3 illustrates a modification of the pre-treatment apparatus associated with a cement slurry pressure-filter A which utilizes the same principles of gas flow which were heretofore described in connection with the pre-treatment apparatus illustrated in Figures 1 and 2. The dust-laden kiln gas is introduced into chamber 17 through the channel 19, and the gas is drawn downwardly through the nodule layer 14 into the suction box 18 by the fan 24. The fan 24 discharges the gas into the conduit 25 from which it is delivered into the drying chamber 26. This gas is then drawn downwardly through the nodule layer 14 by a fan (not illustrated) which discharges the gas into the stack 29. In the modification the drying chamber 26 and the pre-burning chamber 17 are spaced apart, and the traveling gas-pervious grate 11 serving the drying chamber discharges the nodule layer into the hopper 113 from which the nodule material is fed to the traveling gas-pervious grate 111 which then conveys the layer through the pre-burning chamber 17. The brush line 50 which opens into conduit 25 between the drying and pre-burning chambers may be connected with the lower end of the rotary kiln 15 in the manner described more fully in my copending application Serial No. 731,505, filed February 28, 1947, in order to utilize the heat which escapes from the calcined cement discharge port provided in the lower end of the rotary kiln.

It will be apparent that the described apparatus produces particular advantages by substantially reducing the amount of material dust which is discharged into the atmosphere in the exhaust gases of the process by first passing the dust-laden kiln gases through the layer of raw material in the pre-burning zone and thereafter subjecting the gas to the filtering action of the layer in the drying zone where the material is still moist and exerts greatest filtering effect. Consequently, the gas exhausted from the process by the fan 30 is substantially dust free; for example, tests have indicated that the dust contained in the process exhaust gases is only .15% of the weight of the material pre-burned on the grate, whereas in the ordinary process the amount of dust in the exhaust gases is about 3%. Passing the gases downwardly through the layer of material in the drying zone is a critical factor since it has been determined that the under-portion of the layer retains moisture longer than the portion first contacted by the hot gases and consequently the gases passing in a downward direction through the layer make final contact before being discharged into the atmosphere with the material which is dust free and still capable of filtering action. This also accomplishes a better utilization of the heat of the gases since the heat differential between the gases and the material is the maximum obtainable during the entire transit of the gases through the material.

The described process and apparatus show marked superiority over several processes heretofore suggested which attempted to pass kiln exit gas twice through the layer of material upon the grate. In these processes a single fan was employed and the hot kiln gas was moved through the pre-burning zone in downward movement and then in upward movement through the drying zone. This method was unsatisfactory since the upper layer of cement nodules in the drying chamber remained moist. When these moist nodules passed suddenly into the 1800° F. heat existing in the pre-burning chamber the nodules cracked due to formation of steam within the nodule and formed a powder which choked passage of gas through the layer. The present invention obviates this shortcoming in the manner heretofore described.

A further advantage of the instant invention as illustrated in Figures 1 and 2 resides in enveloping the suction box 28 and the return strand of the grate within suction box 18 and in locating the fan 24 at the cold end of the grate whereby the returning strand of the grate in chamber 18 remains in relatively high temperature gas which keeps the temperature of the grate high and thereby prevents condensation of water, accumulation of dirt and clogging up of the grate below the cold nodules. By using two fans for moving of gas in the indicated way a further advantage is obtained in that the gas pressure above the grate in chambers 26 and 17 remains balanced and can be maintained close to atmospheric pressure. The negative pressure or suction in boxes 18 and 28 are also almost equal, usually from 1.5 to 6 inches water gauge. An equalization of the pressures in the mentioned chambers prevents an undesirable mixing of gases from one chamber to another.

The inclined lay-out of the grate saves height of the building necessary for locating the associated nodulizing equipment which fills the bin 13.

Having thus described the invention, what is claimed as new and desired to be secured by Letters Patent is:

1. A rotary cement kiln comprising the combination of a rotary furnace with a raw material pre-treatment apparatus, said apparatus including a burning chamber, a drying chamber, a suction box disposed under said drying chamber, a second suction box disposed under said burning chamber, a conduit connecting said furnace and said burning chamber for conducting pre-treated raw material to said furnace and furnace gas to said burning chamber, a traveling gas-pervious grate interposed between said boxes and said chambers, means for feeding cement raw materials to the portion of the gas-pervious grate adjacent to the said drying chamber, means connected to said second named suction box and said drying chamber for drawing the gas through said grate and second named suction box and discharging the gas into said drying chamber, and means connected with said first named suction box for withdrawing said gas from said drying chamber downwardly through said grate.

2. A rotary cement kiln comprising the combination of a rotary furnace with a raw materials pretreatment apparatus, said apparatus including a burning chamber, a drying chamber, a suction box disposed under said drying chamber, a second suction box disposed under said burning chamber, a conduit connecting said furnace and said burning chamber for conducting pre-treated raw material to said furnace and furnace gas to said burning chamber, a traveling gas pervious grate interposed between said boxes and said chambers, means for feeding cement raw materials to the portion of the gas pervious grate adjacent to said drying chamber, said chambers having a common wall terminating above said grate, means connected to said second named suction box and said drying chamber for drawing gas through said grate and second named suction box and discharging the gas into said drying chamber, and means connected with said first named suction box for withdrawing said gas from said drying chamber downwardly through said grate.

3. A rotary cement kiln comprising the combination of a rotary furnace with a raw material pretreatment apparatus, said apparatus including a burning chamber, a drying chamber, a suction box disposed under said drying chamber, a second suction box disposed under said burning chamber, a conduit connecting said furnace and said burning chamber for conducting pre-treated raw material to said furnace and furnace gas to said burning chamber, a traveling gas pervious grate interposed between said boxes and said chambers, said chambers having a common wall terminating above said grate, means for feeding cement raw materials to the portion of the gas pervious grate adjacent to said drying chamber, means including a conduit and fan connected to said second named suction box and said drying chamber for drawing the gas through said grate and second named suction box and discharging the gas into said drying chamber, and suction means including a fan connected with said first named suction box for withdrawing the gas from said drying chamber downwardly through said grate.

4. A process for manufacturing cement and of utilizing and conditioning dust-laden hot kiln gases of a rotary cement kiln in the manufacture of the cement, comprising the steps of forming cement raw material into small moist lumps or nodules, conveying a layer of said nodules into drying and pre-burning zones successively, passing hot dust-laden kiln gases downwardly through said layer in said pre-burning zone, thereafter conducting said gases to said drying zone and passing said gases downwardly through said layer in said drying zone, conveying said layer out of said drying zone before the lower portion of the layer becomes dry as a result of the gases passing downwardly through said layer in said drying zone, whereby said nodules are subjected to slow drying and material dust carried by said gases is filtered out by the moist nodules in the lower portion of said layer in said drying zone, and feeding the pre-burned nodules from said pre-burning zone into a kiln for final burning.

5. A process for manufacturing cement and of utilizing and conditioning dust-laden hot kiln gases of a rotary cement kiln in the manufacture of the cement comprising the steps of forming cement raw materials into small, moist lumps or nodules, conveying a layer of said nodules into drying and pre-burning zones successively, passing hot dust-laden kiln gases downwardly through said layer in said pre-burning zone, thereafter passing said gases downwardly through said layer in said drying zone, conveying said layer out of said drying zone before the lower portion of the layer becomes dry as a result of the gases passing downwardly through said layer in the said drying zone, whereby said nodules are subjected to slow drying and material dust carried by said gases is filtered out by the moist nodules in the lower portion of said layer in said drying zone, feeding the pre-burned nodules from said pre-burning zone into a rotary kiln for final burning, and conducting the hot dust-laden exhaust gases from said rotary kiln to said pre-burning and drying zones in the aforesaid manner.

OTTO GEORGE LELLEP.

REFERENCES CITED

The following references are of record in the file of this patent:

UNITED STATES PATENTS

| Number | Name | Date |
|---|---|---|
| 1,215,636 | Dwight | Feb. 13, 1917 |
| 1,215,637 | Dwight | Feb. 13, 1917 |
| 1,761,016 | Koehring et al. | June 3, 1930 |
| 1,775,313 | Lellep | Sept. 9, 1930 |
| 2,143,905 | Ahlmann | Jan. 17, 1939 |
| 2,148,052 | Ahlmann | Feb. 21, 1939 |
| 2,214,345 | Pike | Sept. 10, 1940 |